March 18, 1952     I. E. ASKE     2,589,595
APPARATUS FOR DISTRIBUTING SOLUBLE MATERIAL
Filed Sept. 17, 1947     2 SHEETS—SHEET 1
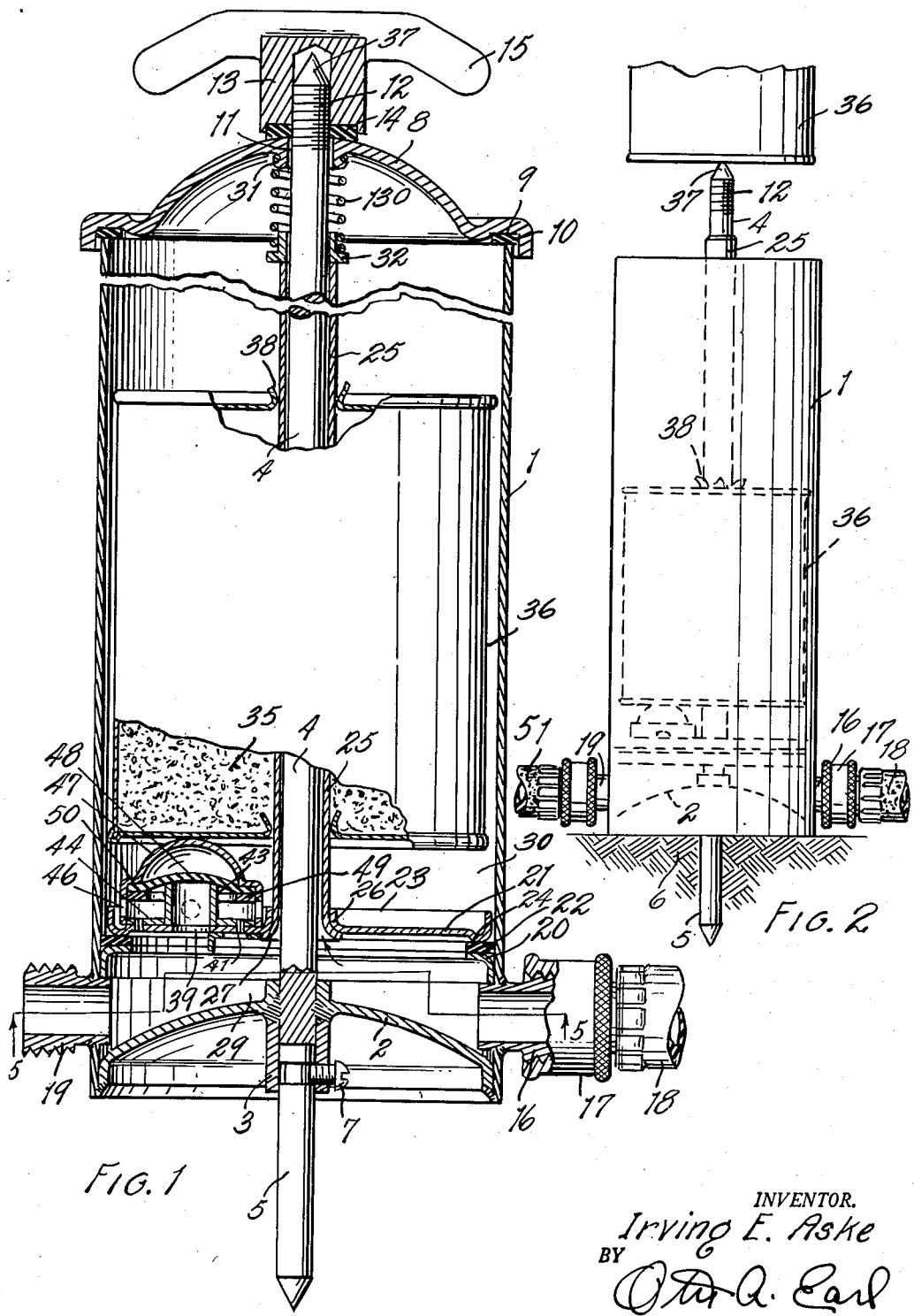
INVENTOR.
Irving E. Aske
BY
Otto A. Earl
Attorney.

March 18, 1952     I. E. ASKE     2,589,595

APPARATUS FOR DISTRIBUTING SOLUBLE MATERIAL

Filed Sept. 17, 1947     2 SHEETS—SHEET 2

INVENTOR.
Irving E. Aske
BY
Attorney.

Patented Mar. 18, 1952

2,589,595

UNITED STATES PATENT OFFICE 2,589,595

APPARATUS FOR DISTRIBUTING SOLUBLE MATERIAL

Irving E. Aske, Muskegon, Mich.

Application September 17, 1947, Serial No. 774,554

9 Claims. (Cl. 299—84)

This invention relates to improvements in a spraying apparatus for distributing fertilizers, weed killer, and the like material.

The main objects of this invention are:

First, to provide a spraying apparatus for the distribution of water soluble fertilizers and weed killing materials through a hose spraying under water pressure.

Second, to provide an apparatus of this character which will distribute the material in a predetermined and substantially uniform concentration.

Third, to provide a spraying apparatus having valve means for regulating the concentration of the material distributed.

Fourth, to provide an apparatus of this character which may be conveniently charged and operated.

Fifth, to provide an apparatus which is not likely to become clogged when in use, and which may be readily disassembled for cleaning.

Sixth, to provide a spraying apparatus having these advantages in which the discharge of the material automatically stops when the water pressure is cut off and automatically opened by the water pressure to permit water to mix with the material distributed when the device is in operation.

Objects relating to details and economies of the invention will appear from the description to follow. The invention is defined in the claims.

Fig. 1 is a fragmentary side elevational view mainly in vertical section, a material can being illustrated within the tank.

Fig. 2 is a side elevational view with the inlet and delivery hose broken away, the cover being removed and initial step of inserting the can of material into the tank being illustrated. The device is further illustrated as supported on the ground or turf.

Figure 7:
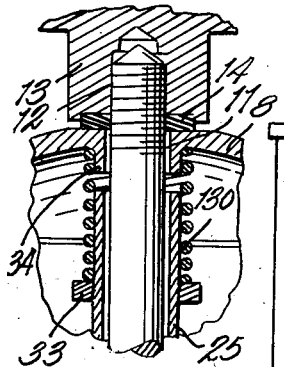
Fig. 7 is an enlarged fragmentary view mainly in section illustrating a modified form or embodiment of my invention.

In the embodiment of my invention illustrated in the accompanying drawing, the tank 1 is cylindrical in form and is provided with a convex bottom 2 inset to provide stability when the tank is placed upon a lawn or sidewalk or the like. The bottom is welded to the walls of the tank, and being convex, more effectively resist pressure in the tank than would a flat bottom.

The socket member 3 is welded to the bottom centrally thereof, the tie rod 4 being welded in the upper portion of the socket, the socket opening downwardly to receive the spud 5 which may be inserted in the ground as is indicated at 6 in Fig. 2. The spud is detachably secured by means of the screw 7 so that the tank may be placed on a walk or smooth surface as desired. The spud is desirable when the sprayer is placed on the ground or turf as it keeps the sprayer in upright position.

The cover 8 is flanged to embrace the upper end of the tank and has an annular gasket recess 9 receiving the gasket 10 which engages the upper end of the tank. The tie rod projects above the upper end of the tank and extends through a central opening 11 in the cover, the tie rod being threaded at 12 to receive the clamping nut 13.

The gasket 14 is seated in the under side of the nut. The nut is provided with wings 15 by which it may be manipulated and also these wings serve as hand holds for carrying the sprayer.

The tank is provided adjacent to the bottom thereof with an inlet nipple-like connection 16 adapted to receive the coupling 17 of the inlet hose 18 and has a second nipple 19 to which the discharge hose 51 may be connected. It is not important whether the supply connection is made to the nipple 16 or to the nipple 19. An annular ledge or seat 20 is secured within the tank above the inlet and outlet connections preferably resting thereon.

The partition or valve plate 21 is adapted to be supported on this seat member, the seat being provided with a gasket 22. The plate 21 has a peripheral flange 23 and a downwardly facing bead 24 at the base of the flange, this bead providing a rounding face coacting with the gasket. The tube 25 is secured within the central flanged opening 26 in the plate, the lower end of the tube being flared outwardly at 27. This tube serves as a guide member for the plate and also as a conduit opening to the space below the plate and delivering at the upper end of the tank. The plate 21 divides the tank into a mixing chamber 29 and a supply chamber 30, the material such as fertilizers or weed killer being placed in the supply chamber.

Figure 4:
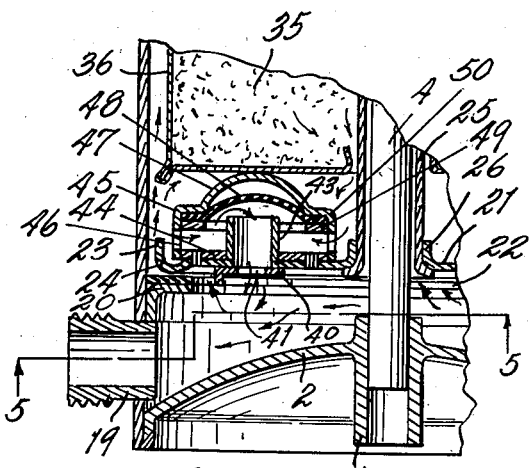
Fig. 4 is an enlarged fragmentary view mainly in vertical section corresponding to that of Fig. 1 illustrating the valve or partition plate raised from its seat, the flow of water being indicated by arrows, and the discharge valve for the supply chamber being open.
Figure 6:
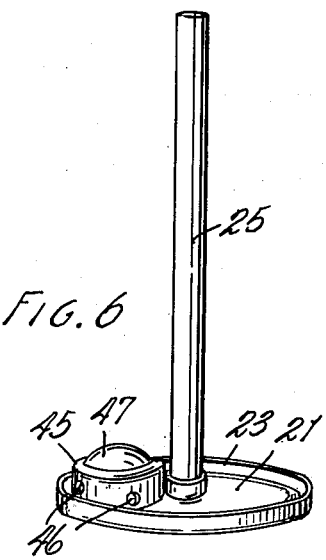
Fig. 6 is a perspective view of the partition or valve plate removed from the tank.

The partition plate which as stated constitutes a valve member, is floatingly supported; that is, it may raise and lower, it being shown in open position in Fig. 4. Applicant believes, however, that it only opens momentarily; that is, it alternately opens and closes when the apparatus is in operation at very frequent intervals.

The plate 21 is urged yieldingly downward by the coil spring 130, the upper end of which engages the inwardly projecting flange 31 surrounding the opening 11 in the cover, the lower end of which is in thrust engagement with the collar 32 engaging the upper end of the tube.

In the modifications shown in Fig. 7, the thrust collar 33 is forced upon an upper end of the tube, the spring 130 embracing the upper end of the tube and the flange 34 corresponding to the flange 31 on the cover. The embodiment shown in Fig. 7 is somewhat more economical and the spring is supported substantially through its length.

In the accompanying drawings, the material to be distributed indicated at 35 is left in the can 36. The can is forced over the tie rod and tube, the tie rod having a pointed end 37 facilitating this operation. The rod and tube form punctures 38 in the top and bottom of the can. However, it is desired to point out that the material may be dumped into the material or supply chamber.

Figure 5:
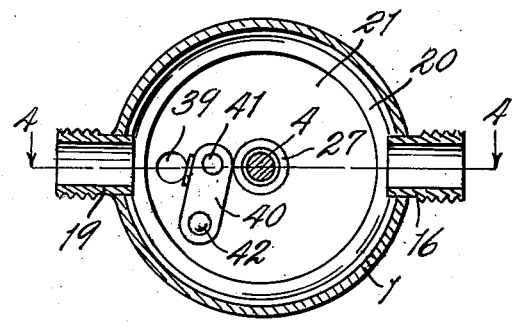
Fig. 5 is a horizontal section on a line corresponding to broken line 5—5 of Fig. 4.

The plate 21 is provided with a discharge port 39 preferably provided with a regulating valve 40 in the form of a flat plate having an opening 41 therein adapted to be brought into register with the port 39, or to be swung to one side thereof as is shown in Fig. 5. The opening 41 is smaller than the discharge port 39. The valve 40 is pivoted on the underside of the valve plate for adjustment relative to discharge plate 21 so that the port 41 of the valve 40 may be brought into register with the discharge port 39 and thereby regulating the discharge opening. This adjustment is desirable depending upon the character strength of the material being distributed or the strength of the solution to be delivered. Delivery through the port 39 is controlled by a valve mechanism consisting of the tubular valve seat member 43 which is carried by the plate 44 secured to the top of the plate 21. The valve casing 45 embraces the edges of the plate 44 and it is provided with side inlet ports 46 and has a domed top 47. The elastic diaphragm valve 48 is secured airtight by means of the retaining ring 49 against the shoulder 50 at the top of the casing. The elastic diaphragm valve may expand into the domed chamber 55, this expansion being resisted by compressing the air enclosed in the chamber between the diaphragm and the top of the casing.

With a charge of material to be distributed in the supply chamber of the tank, water is supplied through the hose 18, the delivery hose 51 being provided with a spray head controlled by a valve mechanism indicated generally by the numeral 53 or the hose nozzle 54 which may be substituted for the spray head. Applicant deems it desirable to use the spray head when distributing weed killer and the nozzle when distributing fertilizer. In distributing weed killer, it is desirable to have a fine spray and direct the spray onto the weeds to be destroyed, whereas with the distributing of fertilizers, a general distribution is desired. The slide valve 40 is desirable in the use of materials of high solubility; for example, weed killer which the applicant has used in the apparatus being of higher solubility than the fertilizer. It is contemplated that both the fertilizer and the weed killing material shall be substantially water soluble. The apparatus is not particularly designed for the distribution of fertilizers having a large percentage of non-soluble material or not readily soluble material.

Figure 3:
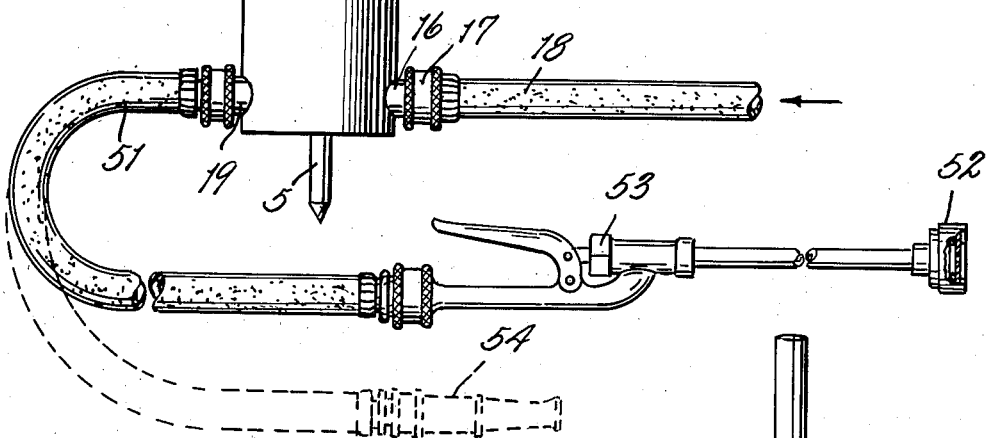
Fig. 3 is a fragmentary side elevation illustrating my spray apparatus as provided with a valve control spray nozzle such as is employed in the distribution of weed killer, the hose nozzle being indicated by dotted lines and being commonly employed in the distribution of fertilizer.

In use, the material to be distributed such as ammonium sulphate is placed in the supply chamber either in the can as is illustrated in the drawings or merely dumped into the tank above the plate 21, water pressure being supplied through the hose connection 18 or other suitable connection, the discharge being controlled either by the spray nozzle or head as shown in full lines in Fig. 3 or through the spray nozzle such as the hose nozzle 54. Pressure of the water in the mixing chamber forces water past the plate 21 which as stated, acts as a valve or through the tube or both into the supply chamber where it dissolves some of the fertilizer to be distributed, which is then discharged through the opened automatic valve as shown in Fig. 4 into the mixing chamber where it is mixed with the incoming water and discharged through the spray head or nozzle.

It is found that the percentage of the solution distributed remains approximately constant for water pressures varying between 30 and 70 pounds per sq. in. It is desirable after the sprayer has been used to thoroughly clean it before it is put away. This may be conveniently done as the valve plate and parts carried thereby can be removed for cleaning.

I have illustrated and described a practical embodiment of my invention. I have not attempted to illustrate or describe other adaptations or embodiments which I contemplate as it is believed that this disclosure will enable those skilled in the art to adapt or embody my invention as may be desired.

Having thus described my invention, what I claim as new and desire to secure by Letters Patent, is:

1. In a spraying apparatus, the combination of a tank provided with a bottom and having inlet and outlet connections adjacent to said bottom, a tie rod mounted on said bottom centrally thereof, a detachable cover, an annular partition plate seat member disposed above said inlet and outlet connections, a partition plate movably seating on said partition plate seat, the chamber below said plate constituting a mixing chamber and the chamber above said plate constituting a material supply chamber, a tube carried by and projecting upwardly from said plate in concentric relation to said tie rod, said tube opening at its lower end below said plate and delivering at its upper end to the upper end of said supply chamber, a tubular valve seat member on said plate to move therewith, said plate having a discharge port opening to said valve seat member and provided with a regulating valve, a valve casing having a side inlet port and a closed top mounted on said plate to surround said valve seat member and to move with said plate, and an elastic diaphragm valve mounted within said casing to coact with and normally seat on said valve seat member and subject to the pressure of the fluid above said plate whereby it automatically opens when such pressure exceeds a predetermined degree, the space between the diaphragm and the top of the casing constituting a closed air chamber, the air in which acts to resist the opening movement of the diaphragm.

2. In a spraying apparatus, the combination of a tank provided with a bottom and having inlet and outlet connections adjacent to said bottom, a rod mounted on said bottom centrally thereof and projecting above the top of the tank, said rod being externally threaded at its upper end and having a pointed tip for piercing the ends of a container pressed thereagainst, a cover provided with a sealing gasket seating on the upper end of the tank and having a central opening through which said rod projects, a cover clamping nut threaded upon said rod and provided with a hand piece, an annular partition plate seat member disposed above said inlet and outlet connections, a movable partition plate disposed above and constituting a check valve seating on said partition plate seat, the chamber below said plate constituting a mixing chamber and the chamber above said plate constituting a material supply chamber, a tube carried by and projecting upwardly from said plate to surround said rod, said tube opening at its lower end below said plate delivering at its upper end to the upper end of said supply chamber, and a pressure actuated discharge valve carried by said plate to move therewith.

3. In a spraying apparatus, the combination of a tank provided with a bottom and having inlet and outlet connections adjacent to said bottom, a detachable cover, an annular partition plate seat member disposed above said inlet and outlet connections, a movable partition plate disposed above and constituting a check valve seating on said partition plate seat, the chamber below said plate constituting a mixing chamber and the chamber above said plate constituting a material supply chamber, a tube carried by and projecting upwardly from said plate, said tube opening at its lower end below said plate delivering at its upper end to the upper end of said supply chamber, a biasing spring for said plate in thrust engagement with said tube and said cover, and a pressure actuated discharge valve carried by said plate to move therewith.

4. In a spraying apparatus, the combination of a tank provided with a bottom and having inlet and outlet connections adjacent to said bottom, a detachable cover, an annular partition plate seat member disposed above said inlet and outlet connections, a movable partition plate disposed above and constituting a check valve seating on said partition plate seat, the chamber below said plate constituting a mixing chamber and the chamber above said plate constituting a material supply chamber, a tube carried by and projecting upwardly from said plate, said tube opening at its lower end below said plate delivering at its upper end to the upper end of said supply chamber, and a fluid actuated discharge valve carried by said plate to move therewith.

5. In a spraying apparatus, the combination of a tank provided with inlet and outlet connections, a detachable cover, an annular partition plate seat member disposed above said inlet and outlet connections and having a gasket thereon, a movable partition plate disposed above and constituting a check valve seating on said partition plate seat gasket and having an upturned rim adjacent to but spaced from the wall of the tank and an annular seat engaging bead, the chamber below said plate constituting a mixing chamber and the chamber above said plate constituting a material supply chamber, a tubular valve seat member on said plate to move therewith, said plate having a port opening to said valve seat member, a valve casing having a side inlet port and a domed top mounted on said plate to surround said valve seat member and to move with said plate, and an elastic diaphragm valve mounted within said casing to coact with and normally seat on said valve seat member and subject to the pressure of fluid above said plate, the space between the diaphragm and the dome of the casing constituting a closed air chamber.

6. In a spraying apparatus, the combination of a tank provided with inlet and outlet connections, a detachable cover, an annular partition plate seat member disposed above said inlet and outlet connections, a movable partition plate constituting a valve seating on said partition plate seat gasket and having an upturned rim adjacent to but spaced from the wall of the tank and an annular seat engaging bead, the chamber below said plate constituting a mixing chamber and the chamber above said plate constituting a material supply chamber, a tubular valve seat member on said plate to move therewith, said plate having a port opening to said valve seat member, a valve casing having a side inlet port and a domed top mounted on said plate to surround said valve seat member and to move with said plate, and an elastic diaphragm valve mounted within said casing to coact with and normally seat on said valve seat member and subject to the pressure of fluid above said plate, the space between the diaphragm and the dome of the casing constituting a closed air chamber.

7. In a spraying apparatus, the combination of a tank provided with inlet and outlet connections, a detachable cover, an annular partition plate seat member disposed above said inlet and outlet connections, a movable partition plate constituting a valve seating on said partition plate seat gasket and having an upturned rim adjacent to but spaced from the wall of the tank and an annular seat engaging bead, the chamber below said plate constituting a mixing chamber and the chamber above said plate constituting a material supply chamber, a tubular valve seat member on said plate to move therewith, said plate having a port opening to said valve seat member and provided with a regulating valve, a valve casing having a side inlet port and a domed top mounted on said plate to surround said valve seat member and to move with said plate, and an elastic diaphragm valve mounted within said casing to coact with and normally seat on said valve seat member and subject to the pressure of fluid above said plate, the space between the diaphragm and the dome of the casing constituting a closed air chamber.

8. In a spraying apparatus, the combination of a tank having a closure and inlet and outlet connections, a partition plate movably supported in said tank above said inlet and outlet connections, the chamber below said plate constituting a mixing chamber and the chamber above constituting a material supply chamber, said plate constituting a valve permitting the passage of fluid from said mixing chamber to said supply chamber, and a pressure actuated discharge valve for said supply chamber to said mixing chamber, said discharge connection being disposed on said plate to move therewith.

9. In a spraying apparatus, the combination of a tank having closed top and provided with inlet and outlet connections, a partition disposed above said inlet and outlet connections, the chamber below said partition constituting a mixing chamber and the chamber above constituting a material supply chamber, there being a fluid connection from said mixing chamber to said supply chamber permitting the passage of fluid into the supply chamber, and a pressure actuated discharge valve for said supply chamber to said mixing chamber.

IRVING E. ASKE.

REFERENCES CITED

The following references are of record in the file of this patent:

UNITED STATES PATENTS

| Number | Name | Date |
| --- | --- | --- |
| 412,910 | Blessing | Oct. 15, 1889 |
| 1,287,119 | Shurtleff | Dec. 10, 1918 |
| 1,773,726 | Deming | Aug. 26, 1930 |
| 2,178,735 | Behrman | Nov. 7, 1939 |
| 2,301,691 | Ellinger et al. | Nov. 10, 1942 |
| 2,345,275 | Marvin | Mar. 28, 1944 |